(12) United States Patent
Speith-Herfurth et al.

(10) Patent No.: US 7,678,461 B2
(45) Date of Patent: Mar. 16, 2010

(54) BIAXIALLY ORIENTED POLYPROPYLENE FILM PROVIDED WITH A COLD-SEAL ADHESIVE COATING AND HAVING EXCELLENT LUBRICATING PROPERTIES

(75) Inventors: Angela Speith-Herfurth, Egelsbach (DE); Robert Hansohn, Kirkel (DE)

(73) Assignee: Treofan Germany GmbH & Co. KG (DE)

( * ) Notice: Subject to any disclaimer, the term of this patent is extended or adjusted under 35 U.S.C. 154(b) by 1071 days.

(21) Appl. No.: 10/552,572

(22) PCT Filed: Apr. 8, 2004

(86) PCT No.: PCT/EP2004/003751

§ 371 (c)(1),
(2), (4) Date: Oct. 11, 2005

(87) PCT Pub. No.: WO2004/089621

PCT Pub. Date: Oct. 21, 2004

(65) Prior Publication Data

US 2006/0222867 A1    Oct. 5, 2006

(30) Foreign Application Priority Data

Apr. 11, 2003   (DE) ............... 103 16 623

(51) Int. Cl.
*B32B 27/08* (2006.01)
*B32B 27/18* (2006.01)

(52) U.S. Cl. ............... 428/447; 428/451; 428/500; 428/516; 428/910; 427/355

(58) Field of Classification Search ............ None
See application file for complete search history.

(56) References Cited

U.S. PATENT DOCUMENTS

| | | | |
|---|---|---|---|
| 3,299,010 A | 1/1967 | Samour | |
| 3,740,366 A | 6/1973 | Sanderson et al. | |
| 4,012,560 A | 3/1977 | Baatz et al. | |
| 4,387,172 A | 6/1983 | Agarwal et al. | |
| 4,622,237 A | 11/1986 | Lori | |
| 4,786,533 A * | 11/1988 | Crass et al. | 428/13 |
| 4,810,745 A | 3/1989 | Pike et al. | |
| 4,851,459 A | 7/1989 | Ramalingam | |
| 4,889,884 A | 12/1989 | Dust et al. | |
| 4,902,370 A | 2/1990 | Dust et al. | |
| 5,436,041 A * | 7/1995 | Murschall et al. | 428/34.2 |
| 5,482,780 A | 1/1996 | Wilkie et al. | |
| 5,681,650 A | 10/1997 | Peiffer et al. | |
| 5,798,174 A | 8/1998 | Wilkie | |
| 5,981,047 A | 11/1999 | Wilkie | |
| 6,022,612 A | 2/2000 | Wilkie | |
| 6,074,731 A | 6/2000 | Wilkie | |
| 6,087,015 A * | 7/2000 | Cretekos et al. | 428/447 |
| 6,811,886 B1 * | 11/2004 | Speith-Herfurth et al. | 428/516 |
| 2002/0032295 A1 | 3/2002 | Peiffer et al. | |

FOREIGN PATENT DOCUMENTS

| | | |
|---|---|---|
| EP | 0 182 463 | 5/1986 |
| EP | 0 645 426 | 3/1995 |
| WO | WO-00/73064 | 12/2000 |
| WO | WO-2004/090059 | 10/2004 |

* cited by examiner

*Primary Examiner*—Monique R Jackson
(74) *Attorney, Agent, or Firm*—Connolly Bove Lodge & Hutz LLP

(57) ABSTRACT

The invention relates to a multi-layer biaxially oriented polypropylene film consisting of a base layer at least one first cover layer. The base layer contains a hydrocarbon resin, and the cover layer contains a polydialkylsiloxane with a viscosity of at least 200.000 mm$^2$/sec. The first cover layer is provided with a cold-seal adhesive coating on its outer surface.

18 Claims, No Drawings

BIAXIALLY ORIENTED POLYPROPYLENE FILM PROVIDED WITH A COLD-SEAL ADHESIVE COATING AND HAVING EXCELLENT LUBRICATING PROPERTIES

RELATED APPLICATIONS

This application is a national stage application (under 35 U.S.C. 371) of PCT/EP2004/003751 filed Apr. 8, 2004 which claims benefit to German application 103 16 623.8 filed Apr. 11, 2003.

The present invention relates to a polypropylene film having a coating made of cold sealing adhesives, which has very good lubricating and sealing properties.

Biaxially oriented polypropylene films (boPP) are currently used as packaging films in greatly varying applications. Polypropylene films are distinguished by advantageous usage properties such as high transparency, gloss, barriers to water vapor, good printability, rigidity, puncture resistance, etc. Sealing methods are used for manufacturing a package from these films, in which the outer layers of the films are stuck together using pressure and elevated temperature (hot sealing). For packaging temperature-sensitive products, cold sealing layers are used, which stick together at room temperature only under pressure. Cold sealing adhesives of this type are based on natural or synthetic latex compositions, which are applied to an outer film surface. The diametrically opposite side may not stick to or block with the cold sealing adhesive during winding of the film thus coated and is therefore generally referred to as the release side. To ensure adequate release properties of this side, frequently, a suitable lacquer is applied or it is laminated against a release film.

Adding additives to the film, which prevent sticking of the cold sealing layer to the diametrically opposite surface, is also known. These measures have the disadvantage that the sealing properties of the cold sealing adhesive layer may be impaired.

Furthermore, it is known that a rough surface structure of the cold sealing side is advantageous for good anchoring of the cold sealing layer on the film surface. Therefore, opaque films having a vacuole-containing layer or having a pigmented layer are frequently used for these applications, which have greater surface roughness than transparent films due to the vacuoles or the pigments. For some applications, however, the high transparency of the polypropylene films is to be maintained. For these types, good anchoring of the cold sealing layer is especially critical.

Various films have been suggested in the related art which may be advantageously provided with a cold sealing adhesive coating. U.S. Pat. No. 5,482,780 describes a film having good adhesion in relation to cold sealing adhesives, which simultaneously has good release properties on the diametrically opposite side. The film is multilayered and has two cover layers on the base layer, which is made of polypropylene. The release cover layer comprises a blend which contains an ethylene-propylene copolymer which has a low ethylene content of 2 to 8%. The second component of the blend is an ethylene-butylene copolymer which contains 0.5 to 6% ethylene. A non-migrating lubricant is added to this side. The diametrically opposite cover layer, which is coated with the cold sealing adhesive, is synthesized from an ethylene-propylene copolymer which is corona treated to improve the cold sealing adhesive adhesion. The adhesion of the cold sealing adhesive and the sealing properties of the cold sealing adhesive are in need of improvement.

U.S. Pat. No. 6,022,612 also describes a multilayered biaxially oriented polypropylene film having a cover layer for cold sealing coatings. This cover layer is made of a blend of polyolefin and a block copolymer. Block copolymers are, for example, styrene-isoprene-styrene block copolymers or styrene-butadiene-styrene block copolymers. This cover layer has a matte appearance, but good adhesion of the cold sealing adhesive. Because of the cover layer mixture, the films have elevated turbidity, which is not accepted for all applications.

U.S. Pat. No. 5,981,047 also describes a matte film for cold sealing adhesive applications. The film has a release cover layer, which is synthesized from a blend. An essential component of this blend is an ethylene-butylene copolymer.

U.S. Pat. No. 6,074,731 describes a multilayered film having a cover layer for cold sealing coatings, which comprises a blend of two components. One component of the blend is an HDPE. The second blend component is a polyisobutylene. These cover layers are to have good adhesion in relation to cold sealing adhesives.

The object of the present invention is to provide a biaxially oriented polypropylene film which is especially well suitable for cold sealing adhesive applications. The film is to have a surface which may be provided with a cold sealing adhesive and has good adhesion in relation to the cold sealing adhesive. Furthermore, the cold sealing adhesive is to have good sealing strength in relation to itself.

Other film properties which are required in regard to the use as a packaging film may not be influenced disadvantageously. The film is to have high gloss, no visual defects in the form of pinholes or bubbles, interference-free running on rapidly running packaging machines, and low film turbidity.

This object is achieved by a multilayered transparent biaxially oriented polypropylene film made of a base layer and at least one first cover layer, whose characterizing features are that the base layer contains a hydrocarbon resin and the cover layer contains a polydialkyl siloxane having a viscosity of at least 200,000 mm$^2$/second and the surface of the first cover layer has a cold sealing adhesive coating.

The base layer of the film generally contains 80 to <100 weight-percent, particularly 85 to 95 weight-percent propylene polymer, in relation to the base layer in each case.

In general, the propylene polymer contains at least 90 weight-percent, preferably 94 to 100 weight-percent, particularly 98 to 100 weight-percent propylene. The corresponding comonomer content of at most 10 weight-percent, or 0 to 6 weight-percent, or 0 to 2 weight-percent, respectively, generally comprises ethylene, if it is present. The specifications in weight-percent each relate to the propylene polymer.

Isotactic propylene homopolymers having a melting point of 140 to 170° C., preferably 155 to 165° C., and a melt-flow index (measurement DIN 53 735 at 21.6 N load and 230° C.) of 1.0 to 10 g/10 minutes, preferably 1.5 to 6.5 g/10 minutes, are preferred. The n-heptane-soluble component of the polymers is generally 1-10 weight-percent, preferably 2-5 weight-percent, in relation to the starting polymers. The molecular weight distribution of the propylene polymers may vary within wide limits. The ratio of the weight mean $M_w$ to the numerical mean $M_n$ is generally between 1 and 15.

It is essential to the present invention that the base layer contains a hydrocarbon resin (also referred to as a "hard resin" in English), preferably in a quantity of 5 to 20 weight-percent, particularly 8 to 15 weight-percent, in relation to the weight of the base layer.

In principle, synthetic resins or resins of natural origin, which are generally partially or completely hydrogenated, come into consideration as hydrocarbon resins. The softening point of the resins is generally above 80° C. (measured according to DIN 1995-U4 and/or ASTM E-28), such resins having a softening point of 100 to 180° C., particularly 110 to 160° C., being preferred. In general, the hydrocarbon resins have a mean molecular weight Mn between 500 and 2500 (Mw 500 to 3000) and therefore differ from long-chain high molecular weight polymers, whose Mw (weight mean) is generally in the magnitude of 10,000 to multiples of 100,000. In addition, resins are amorphous substances which are glass-like and brittle at room temperature, because of which they are also referred to as hard resins. Because of these characteristics, resins of polymers, particularly of propylene polymers, polyethylenes, and similar high molecular weight substances, are different. For the purposes of the present invention, resins having a Mw of 600 to 1200 and a softening point of 100 to 140° C. are particularly preferred.

As defined in the present invention, hydrocarbon resins include, for example, petroleum resins, styrene resins, cyclopentadiene resins, and terpene resins (these resins are described in Ullmanns Encyklopädie der techn. Chemie [Encyclopedia of Technical Chemistry], 4th edition, Volume 12, pages 525 through 555).

The petroleum resins are those hydrocarbon resins which are manufactured through polymerization of deep-decomposed petroleum materials in the presence of a catalyst. These petroleum materials typically contain a mixture of resin-producing substances such as styrene, methylstyrene, vinyl toluene, indene, methyl indene, butadiene, isoprene, piperylene, and pentylene. The styrene resins are homopolymers of styrene or copolymers of styrene with other monomers such as methylstyrene, vinyl toluene, and butadiene. The cyclopentadiene resins are cyclopentadiene homopolymers or cyclopentadiene copolymers, which are obtained from coal tar distillates and decomposed petroleum gas. These resins are manufactured by keeping the materials which contain cyclopentadiene at high temperature for a long time. Dimers, trimers, or oligomers may be obtained as a function of the reaction temperature.

The terpene resins are polymers of terpenes, i.e., hydrocarbons of the formula $C_{10}H_{16}$, which are contained in almost all ethereal oils or oily resins of plants, and phenol-modified terpene resins. Pinene, α-pinene, dipentene, limonene, myrcene, camphene, and similar terpenes are to be cited as special examples of the terpenes. The hydrocarbon resins may also be modified hydrocarbon resins. The modification is generally performed through reaction of the raw materials before polymerization, by introducing special monomers, or through reaction of the polymerized product, hydrogenation or partial hydrogenation particularly being performed.

In addition, styrene homopolymers, styrene copolymers, cyclopentadiene homopolymers, cyclopentadiene copolymers, and/or terpene polymers having a softening point of above 135° C. in each case are additionally used as the hydrocarbon resins (for the unsaturated polymers, the hydrogenated product is preferred). The cyclopentadiene polymers having a softening point of at least 140° C. or copolymers made of α-methylstyrene and vinyl toluene having a softening point of 120 to 150° C. are very especially preferably used in the base layer.

In addition to the component of resin essential to the present invention, the base layer may contain typical additives, preferably neutralization agents and stabilizers, as well as possibly additional antistatic agents and/or lubricants in the particular effective quantities, no vacuole-initiating fillers or pigments being added to the base layer, however, since the base layer is to be transparent.

Preferred antistatic agents are alkali-alkanesulfonates and/or the essentially straight-chain and saturated aliphatic, tertiary amines having an aliphatic residue having 10 to 20 carbon atoms, which are substituted by ω-hydroxy-($C_1$-$C_4$)-alkyl groups, N,N-bis-(2-hydroxyethyl)-alkyl amines having 10 to 20 carbon atoms, preferably 12 to 18 carbon atoms, in the alkyl residue being especially suitable. The effective quantity of antistatic agent is in the range from 0.05 to 0.5 weight-percent. Furthermore, glycerin monostearate may be used as an antistatic agent in a quantity of 0.03% to 0.5%.

Lubricants are higher aliphatic acid amides, higher aliphatic acid esters, waxes, and metal soaps. The effective quantity of lubricant is in the range from 0.01 to 3 weight-percent, preferably 0.02 to 1 weight-percent. The addition of higher aliphatic acid amides in the range from 0.01 to 0.25 weight-percent in the base layer is especially suitable. A particularly suitable aliphatic acid amide is erucic acid amide.

The typical stabilizing compounds for ethylene, propylene, and other α-olefin polymers may be used as stabilizers. The quantity added is between 0.05 and 2 weight-percent. Phenolic stabilizers, alkaline/alkaline earth stearates, and/or alkali/alkaline earth carbonates are especially suitable. Phenolic stabilizers are preferred in a quantity from 0.1 to 0.6 weight-percent, particularly 0.15 to 0.3 weight-percent, and having a molar mass of more than 500 g/mole. Pentaerythrityl-tetrakis-3-(3,5-di-tertiary butyl-4-hydroxy-phenyl)-propionate or 1,3,5-trimethyl-2,4,6-tris(3,5-di-tertiary butyl-4-hydroxy benzyl) benzol are especially advantageous.

Neutralization agents are preferably dihydrotalcite, calcium stearate, and/or calcium carbonate of a mean particle size of at most 0.7 μm, an absolute particle size of less than 10 μm, and a specific surface area of at least 40 $m^2$/g.

The above specifications in percent each relate to the weight of the base layer.

The polypropylene film according to the present invention comprises at least one cover layer, generally made of propylene polymers. Propylene homopolymers or propylene mixed polymers which predominantly contain propylene are suitable. In general, the cover layer contains at least 80 weight-percent, preferably 85 to 100 weight-percent, particularly 95 to <100 weight-percent propylene polymers, in relation to the weight of the cover layer.

Isotactic propylene homopolymers generally have a melting point of 140 to 170° C., preferably 155 to 165° C., and a melt-flow index (measurement DIN 53 735 at 21.6 N load and 230° C.) of 1.0 to 10 g/10 minutes, preferably from 1.5 to 6.5 g/10 minutes. The n-heptane-soluble component of the propylene homopolymers is generally 1 to 10 weight-percent, preferably 2-5 weight-percent, in relation to the starting polymer.

Propylene mixed polymers predominantly contain propylene units, preferably in a quantity of at least 80 weight-percent, in relation to the propylene copolymer or propylene terpolymer. Butylene or ethylene are preferred as the comonomers, whose proportion is accordingly up to 20 weight-percent. Examples of preferred propylene copolymers or propylene terpolymers are random ethylene-propylene copolymers having an ethylene content of 1 to 10 weight-percent, preferably 2.5 to 8 weight-percent, or random propylene-butylene-1 copolymers having a butylene content of 2 to 25 weight-percent, preferably 4 to 20 weight-percent, each in relation to the total weight of the copolymer, or random ethylene-propylene-butylene-1 terpolymers having an ethylene content of 1 to 10 weight-percent, preferably 2 to 6 weight-percent, and a butylene-1 content of 2 to 20 weight-percent, preferably 4 to 20 weight-percent, each in relation to the total weight of the terpolymer, or a blend or a mixture made of the cited propylene copolymers or propylene terpolymers, a blend made of an ethylene-propylene-butylene-1 terpolymer and a propylene-butylene-1 copolymer having an ethylene content of 0.1 to 7 weight-percent and a propylene content of 50 to 90 weight-percent and a butylene-1 content of 10 to 40 weight-percent, each in relation to the total weight of the polymer blend, being especially preferred.

The copolymers and/or terpolymers described above, which are used in the cover layer, generally have a melt-flow index of 1.5 to 30 g/10 minutes, preferably from 3 to 15 g/10 minutes. The melting point is in the range from 120 to 140° C. The blend of copolymers and terpolymers described above has a melt-flow index of 5 to 9 g/10 minutes and a melting point of 120 to 150° C. All melt-flow indices specified above were measured at 230° C. and a force of 21.6 N (DIN 53 735).

It is essential to the present invention that the cover layer, which is provided with the cold sealing adhesive coating, contains a high-viscosity polydialkyl siloxane. According to the present invention, the viscosity of the polydialkyl siloxane is in a range from 200,000 to 500,000 mm$^2$/second, preferably 250,000 to 350,000 mm$^2$/second. Polydialkyl siloxanes are known per se in the related art as a common lubricant for polypropylene films and are also referred to as silicone oils or siloxanes. Siloxanes are characterized by, among other things, their viscosity, which may be in the range from 10 to 1,000,000 mm$^2$/second. It is known that the substances migrate to the surface of the film in order to unfold an antiadhesive effect there, in separating films, for example, or in order to improve the lubricating properties. The silicone oils reduce the adhesion of the film surface in relation to other surfaces with which the film is brought into contact.

Surprisingly, the cover layer containing the silicone oil may nonetheless be outstandingly coated with a cold sealing adhesive if the film is additionally modified with a hydrocarbon resin in the base layer. In this way, the lubricating properties of the film may be advantageously improved by the silicone oil in a way known per se, but the film may simultaneously be coated surprisingly well with cold sealing adhesive. It has been found that multiple factors must be fulfilled so that the good cold sealing adhesive adhesion on the film and the seal seam strength are ensured in spite of silicone oil. Firstly, as already described, the base layer must be modified with a resin and, in addition, a silicone oil having a selected viscosity must be used. The good cold sealing adhesive adhesion, good seal seam strength of the adhesive, and also good lubricating properties may be implemented only if the viscosity of the silicone oil is in the range from 200,000 to 500,000 mm$^2$/second. At too low a viscosity of the silicone oil, the adhesion of the cold sealing adhesive layer is greatly impaired, at too high a viscosity, the friction and the appearance of the film are negatively influenced in turn. A film which is only equipped with silicone oil in the cover layer displays insufficient adhesion of the cold sealing adhesive and, as a result, poor sealing properties, even if a high-viscosity silicone oil is used. Without resin in the base layer, the variation of the viscosity of the silicone oil does not provide any improvement. Only when the silicone oil is combined with a resin may a high-viscosity silicone oil be found which interacts with the resin in such a way that all desired properties of the film may be implemented.

This interaction of resin and high-viscosity silicone oil is surprising particularly in consideration of the known professional knowledge that siloxane is a typical lubricant which basically reduces the adhesion of the film surface containing silicone oil in relation to other surfaces and thus effectively improves the sliding friction and separating effect of the films.

For the good adhesion of the cold sealing adhesive on the film surface and the sealing properties in connection with the lubricating properties it is therefore essential that the base layer is modified with a resin and the cover layer is modified with a high-viscosity siloxane, whose viscosity is in the selected range from 200,000 to 500,000 mm$^2$/second.

Suitable polydialkyl siloxanes having this viscosity, which are used in the scope of the present invention, are those having alkyl residues, for example. For the purposes of the present invention, polydialkyl siloxanes having C1 to C4 alkyl groups are especially preferred. In general, the cover layer contains 0.5 to 3 weight-percent of the polydialkyl siloxane, preferably 0.8 to 2 weight-percent, in relation to the weight of the cover layer.

If necessary, the additives described above for the base layer may be added to the cover layer, of which antistatic agents, neutralization agents, and/or stabilizers, as well as antiblocking agents, are preferred. The specifications in weight-percent then relate correspondingly to the weight of the cover layer.

In a preferred embodiment, the first cover layer only comprises the propylene polymers described above, polydialkyl siloxane having a viscosity from 200,000 to 500,000 mm$^2$/second, and antiblocking agent, the typical stabilizing and neutralizing through appropriate additives not being excluded, of course.

Suitable antiblocking agents are inorganic accessory agents such as silicon dioxide, calcium carbonate, magnesium silicate, aluminum silicate, calcium phosphate, and the like and/or incompatible organic polymers such as polyamides, polyesters, polycarbonates, and the like, benzoguanamine-formaldehyde polymers, silicon dioxide, and calcium carbonate being preferred. The effective quantity of antiblocking agent is in the range from 0.1 to 2 weight-percent, preferably 0.1 to 0.8 weight-percent. The mean particle size is between 1 and 6 μm, particularly 2 and 5 μm, particles having a spherical shape, as described in EP-A-0 236 945 and DE-A-38 01 535, being especially suitable.

The film according to the present invention comprises at least the base layer described above and a first cover layer containing silicone oil, which is provided with cold sealing adhesive in the use according to the present invention. In general, the diametrically opposite surface of the film must have a release effect in relation to the cold sealing adhesive, so that the cold sealing adhesive does not stick to this second surface during winding of the film into a roll, for example. This release may be implemented by a second diametrically opposite cover layer, for example, in which the release in relation to the cold sealing adhesive is ensured through a suitable formulation, for example, by adding wax. However, it is also possible to provide the surface of the diametrically opposite second cover layer or the surface of the base layer with a release lacquer or to laminate this surface against a further release film. Suitable release layers or technologies are known in the related art.

In a preferred embodiment, a second cover layer is applied to the diametrically opposite surface of the base layer, the construction, thickness, and composition of a second cover layer being selected independently from the first cover layer already provided. The second cover layer may be synthesized in principle from the same propylene polymers described for the first cover layer, or if necessary other polyolefinic polymers and polymer mixtures may also be selected.

The thickness of the first cover layer(s), containing silicone oil, is generally greater than 0.1 μm and is preferably in the range from 0.3 to 3 μm, particularly 0.4 to 1.5 μm. The thickness of the second cover layer is in a similar order of magnitude, preferably 0.5 to 2 μm. The total thickness of the polypropylene film according to the present invention may vary within wide limits and depends on the intended use. It is preferably 4 to 60 μm, particularly 5 to 30 μm, preferably 6 to 25 µm, the base layer corresponding to the difference between the total film thickness and the thickness of the cover layers.

According to the present invention, the film is provided with cold sealing adhesive on the surface of the first cover layer. Cold sealing adhesive layers differ in principle from hot sealing layers in that the sealing is performed at room temperature only through the application of pressure. The packaged product therefore does not experience any temperature stress. The cold sealing adhesive does not require activation by water, solvent, or heat. Cold sealing adhesives are known per se in the related art and are based, for example, on synthetic or artificial latex or rubber, polyurethane, or acrylic polymers. These substances are applied to the film surface from suitable, possibly aqueous solutions. All typical application methods for cold sealing adhesives are suitable, such as gravure printing. Numerous patent specifications describe cold sealing adhesives and improved compositions and the corresponding application methods; for example, in U.S. Pat. No. 3,740,366, U.S. Pat. No. 3,299,010, U.S. Pat. No. 4,012,560, U.S. Pat. No. 4,387,172, U.S. Pat. No. 4,889,884, U.S. Pat. Nos. 4,902,370, 4,810,745, U.S. Pat. No. 4,902,370, or U.S. Pat. No. 4,851,459. Depending on the intended application, the cold sealing adhesive may be applied in sections or over the entire area. If necessary, the surface of the cover layer to be coated may be pretreated using corona, flame, or plasma to improve the cold sealing adhesive adhesion before the application of the adhesive.

Furthermore, the present invention relates to a method for manufacturing the polypropylene film according to the present invention according to coextrusion methods known per se.

In the framework of this method, the melts corresponding to the layers of the film are coextruded through a sheet die, the film thus obtained is drawn off to solidify on one or more roll(s), the film is subsequently biaxially stretched (oriented), the biaxially stretched film is thermally fixed and possibly corona or flame treated on the surface layer provided for treatment.

Biaxial stretching (orientation) is performed sequentially, sequential biaxial stretching, in which stretching is first performed longitudinally (in the machine direction) and then transversely (perpendicular to the machine direction), being preferred.

Firstly, as is typical in coextrusion methods, the polymer and/or the polymer mixture of the individual layers is compressed and liquefied in an extruder, the possibly added additives already able to be contained in the polymer and/or in the polymer mixture. The melts are then extruded simultaneously through a sheet die, and the extruded multilayered film is drawn off on one or more draw-off rolls, so that it cools and solidifies.

The film thus obtained is then stretched longitudinally and transversely to the extrusion direction, which results in orientation of the molecular chains. The longitudinal stretching is expediently performed with the aid of two rolls running at different speeds corresponding to the desired stretching ratio and the transverse stretching is performed with the aid of a corresponding tentering frame. The longitudinal stretching ratios are in the range from 4 to 8, preferably 5 to 6. The transverse stretching ratios are in the range from 5 to 10, preferably 7 to 9.

The biaxial stretching of the film is followed by its thermal fixing (heat treatment), the film being held approximately 0.1 to 10 seconds long at a temperature of 100 to 160° C. The film is subsequently wound up in a typical way using a winding device.

It has been shown to be especially favorable to keep the draw-off roll or rolls, through which the extruded film is cooled and solidified, at a temperature from 10 to 100° C., preferably 20 to 50° C., through a heating and cooling loop.

The temperatures at which longitudinal and transverse stretching is performed may vary in a relatively broad range and depend on the desired properties of the film. In general, the longitudinal stretching is preferably performed at 80 to 150° C. and the transverse stretching is preferably performed at 120 to 170° C.

One or both surfaces of the film is/are preferably corona or flame treated according to one of the known methods after the biaxial stretching. The treatment intensity is generally in the range from 37 to 50 mN/m, preferably 39 to 45 mN/m.

In the corona treatment, the procedure is expediently that the film is guided between two conductor elements used as electrodes, such a high voltage, usually AC voltage (approximately 5 to 20 kV and 5 to 30 kHz) being applied between electrodes that spray or corona discharges may occur. Through the spray or corona discharge, the air above the film surface is ionized and reacts with the molecules of the film surface, so that polar intercalations arise in the essentially non-polar polymer matrix.

For a flame treatment using polarized flame (compare U.S. Pat. No. 4,622,237), an electrical DC voltage is applied between a burner (negative pole) and a cooling roll. The level of the applied voltage is between 400 and 3000 V, and is preferably in the range from 500 to 2000 V. The ionized atoms receive elevated acceleration due to the applied voltage and hit the polymer surface with greater kinetic energy. The chemical bonds within the polymer molecules are broken more easily, and the radical formation occurs more rapidly. The thermal strain of the polymers is much less in this case than in standard flame treatment, and films may be obtained in which the sealing properties of the treated side are even better than those of the untreated side.

The following measurement methods were used to characterize the raw materials and the films:

Melt-Flow Index

The melt-flow index was measured according to DIN 53735 at 21.6 N load and 230° C.

Melting Point

DSC measurement, maximum of the melting curve, heating speed 20° C./minute.

Turbidity

The turbidity of the film was measured according to ASTM-D 1003-52.

Gloss

The gloss was determined according to DIN 67 530. The reflector value was measured as the optical characteristic for the surface of the film. The angle of incidence was set at 60° or 85° in accordance with the standards ASTM-D 523-78 and ISO 2813. A light beam is incident on the flat testing surface at the set angle of incidence and is reflected and/or scattered by the surface. The light beams incident on the photoelectronic receiver are displayed as a proportional electrical variable. The measured value is dimensionless and must be specified with the angle of incidence.

Surface Tension

The surface tension was determined via the ink method according to DIN 53364.

Friction

The friction was measured according to DIN 53375.

Viscosity

The viscosity was determined according to DIN 53018, and/or according to DIN 53019.

Cold Sealing Seam Strength

To determine the cold sealing seam strength, two surfaces coated with cold sealing adhesive were "sealed" with one another. For this purpose, two 15 mm wide film strips were laid one on top of another and pressed in a sealing device HSG from Brugger at room temperature and a sealing time of 0.5 seconds and a sealing pressure of 30 N/cm². Subsequently, the two strips were pulled apart according to the T-peel method. In this case, the force-path diagram during peeling was measured in a typical way. The maximum force before the tearing of the sealed sample was specified as the initial tearing strength.

Cold Sealing Layer Anchoring

The anchoring of the cold sealing layer on the film surface was investigated using an adhesive strip test. For this purpose, an adhesive tape (e.g., from Scotch) was pressed onto the cold sealing layer. Subsequently, in a tensile testing machine, the adhesive tape was pulled off of the film coated with cold sealing adhesive again, the force-path diagram during pulling off being measured in a typical way. In the event of complete transfer of the cold sealing adhesive layer to the adhesive tape, the force which is necessary to pull off the adhesive tape and cold sealing layer corresponds to the anchoring of the cold sealing layer.

The present invention will now be explained on the basis of examples:

EXAMPLE 1

A transparent three-layered film having cover layers on both sides having a total thickness of 20 μm was manufactured through coextrusion and subsequent step-by-step orientation in the longitudinal and transverse directions. The cover layers had a thickness of 0.6 μm each.

Base Layer
- 87.79 weight-percent isotactic propylene homopolymer having a melting point of 163° C. and a melt-flow index of 3.4 g/10 minutes.
- 12.0 weight-percent hydrocarbon resin having a softening point of 120° C. and a mean molecular weight Mw of 1000
- 0.15 weight-percent N,N-bis-ethoxy alkylamine (antistatic agent)
- 0.06 weight-percent erucic acid amide Cover layer 1:
approximately
- 98.87 weight-percent random ethylene-propylene-butylene terpolymer having an ethylene content of 3 weight-percent and a butylene content of 7 weight-percent (remainder propylene)
- 0.33 weight-percent $SiO_2$ as an antiblocking agent having a mean particle size of 2 μm
- 0.90 weight-percent polydimethyl siloxane having a viscosity of 300,000 mm²/second Cover layer 2:
approximately
- 99.37 weight-percent random ethylene-propylene copolymer having an ethylene content of approximately 4.5 weight-percent and a softening point of approximately 130° C.
- 0.33 weight-percent $SiO_2$ as an antiblocking agent having a mean particle size of 2 μm
- 0.30 weight-percent polyethylene wax having a mean molecular weight Mn of 1000

The manufacturing conditions in the individual method steps were:

| | |
|---|---|
| Extrusion: | temperatures base layer: 260° C. |
| | cover layers: 240° C. |
| | temperature of the draw-off roll: 20° C. |
| Longitudinal stretching: | temperature: 110° C. |
| | longitudinal stretching ratio: 5.5 |
| Transverse stretching: | temperature: 160° C. |
| | transverse stretching ratio: 9 |
| Fixing: | temperature: 140° C. |
| | convergence: 20% |

The transverse stretching ratio $\lambda_Q=9$ is an effective value. This effective value is calculated from the final film width B, reduced by twice the border strip width b, divided by the width of the longitudinally-stretched film C, also reduced by twice the border strip width b.

EXAMPLE 2

A film was manufactured as described in Example 1. In contrast to Example 1, the content of polydimethyl siloxane was increased to 1.2 weight-percent. The remaining composition and the manufacturing conditions were not changed in relation to Example 1.

COMPARATIVE EXAMPLE 1

A film was manufactured as described in Example 1. In contrast to Example 1, the film now contained no hydrocarbon resin in the base layer. The remaining composition and the manufacturing conditions were not changed in relation to Example 1.

COMPARATIVE EXAMPLE 2

A film was manufactured as described in Example 1. In contrast to Example 1, the film now contained no polydimethyl siloxane in the first cover layer. The remaining composition and the manufacturing conditions were not changed in relation to Example 1.

COMPARATIVE EXAMPLE 3

A film was manufactured as described in Example 1. In contrast to Example 1, the film now contained 0.9 weight-percent of a polydimethyl siloxane having a viscosity of 30,000 mm²/second in the first cover layer. The remaining composition and the manufacturing conditions were not changed in relation to Example 1.

All films according to the examples and the comparative example were coated in the gravure printing method on the surface of cover layer 1 with a cold sealing adhesive C2881 from Bostik Findley.

The properties of the films according to the examples and the comparative example are summarized in the following table:

| Example Comparative Example | Base layer homopolymer plus | Cover layer 1 (=side coated with cold sealing adhesive) | | Silicone oil | | Cold sealing adhesive anchoring N/15 mm | Seal seam strength N/15 mm | Coefficient of friction |
|---|---|---|---|---|---|---|---|---|
| | | Antiblocking (SiO$_2$) | % | Viscosity/mm$^2$/second | | | | |
| B1 | 12% hydrocarbon resin | 0.33% | 0.9 | 300,000 | | 4.3 | 4.4 | 0.22 |
| B2 | 12% hydrocarbon resin | 0.33% | 1.2 | 300,000 | | 4.0 | 3.9 | 0.18 |
| VB1 | 0% resin | 0.33% | 0.9 | 300,000 | | 2.8 | 3 | 0.23 |
| VB2 | 12% hydrocarbon resin | 0.33% | | None | | 4.5 | 4.5 | 0.80 |
| VB3 | 12% hydrocarbon resin | 0.33% | 0.9 | 30,000 | | 2.7 | 2.8 | 0.26 |

B = example;
VB = comparative example

The invention claimed is:

1. A cold-sealable multilayered transparent biaxially oriented polypropylene film made of a base layer and at least one first cover layer, characterized in that the base layer contains a hydrocarbon resin and the cover layer contains a polydialkyl siloxane having a viscosity of at least 200,000 mm$^2$/second determined according to DIN 53018 and/or DIN 53019 and the first cover layer has a cold sealing adhesive coating on its outer surface.

2. The polypropylene film according to claim 1, characterized in that the base layer contains an isotactic polypropylene having a melting point of 155-165° C.

3. The polypropylene film according to claim 1, characterized in that the base layer contains the hydrocarbon resin in a quantity of 5 to 20 weight-percent, in relation to the weight of the base layer.

4. The polypropylene film according to claim 1, characterized in that the hydrocarbon resin contains a non-hydrogenated styrene polymer, a methylstyrene-styrene copolymer, a pentadiene polymer, a pentadiene and cyclopentadiene copolymer, an α-pinene polymer, β-pinene polymer, colophony or colophony derivatives or terpene polymers and hydrogenated compounds thereof, or hydrated α-methylstyrene-vinyl toluene copolymer or mixtures thereof.

5. The polypropylene film according to claim 1, characterized in that the hydrocarbon resin has a softening point of 100 to 160° C.

6. The polypropylene film according to claim 1, characterized in that the first cover layer contains the polydialkyl siloxane in a quantity of 0.5 to 3 weight-percent, in relation to the weight of the cover layer.

7. The polypropylene film according to claim 1, characterized in that the polydialkyl siloxane has a viscosity of 250,000 to 500,000 mm$^2$/second.

8. The polypropylene film according to claim 1, characterized in that the first cover layer is synthesized from isotactic propylene homopolymers, propylene copolymers, or propylene terpolymers or mixtures of these polymers, the propylene copolymers and terpolymers having a propylene content of at least 80 weight-percent in relation to the polymer.

9. The polypropylene film according to claim 1, characterized in that the first cover layer contains 0.1 to 2 weight-percent antiblocking agent.

10. The polypropylene film according to claim 1, characterized in that the first cover layer comprises propylene polymers, polydialkyl siloxane, and antiblocking agent.

11. The polypropylene film according to claim 1, characterized in that the surface of the first cover layer is pretreated using corona, plasma, or flame.

12. The polypropylene film according to claim 1, characterized in that a second cover layer made of polyolefinic polymers is applied to the diametrically opposite surface of the base layer.

13. The polypropylene film according to claim 1, characterized in that a release layer is applied to the surface diametrically opposite the first cover layer as the outer layer, whose surface has a low adhesion in relation to cold sealing coatings.

14. The polypropylene film according to claim 13, characterized in that the release layer is a release lacquer, a release film, or a second coextruded release cover layer.

15. The polypropylene film according to claim 1, characterized in that the base layer contains an antistatic agent.

16. The polypropylene film according to claim 1, characterized in that all layers of the film contain neutralization agents and stabilizers.

17. A method for manufacturing the polypropylene film according to claim 1, which comprises performing in a gravure printing method the coating of the biaxially oriented film with the cold sealing adhesive.

18. The polypropylene film according to claim 15, wherein said antistatic agent is tertiary aliphatic amine.

* * * * *